3,310,503
FLAME-RETARDING CURABLE MIXTURES
René Huwyler, Birsfelden, Rudolf Aenishaenslin, Reinach, Basel-Land, and Daniel Porret, Basel, Switzerland, assignors to Ciba Limited, Basel, Switzerland, a Swiss company
No Drawing. Filed July 9, 1962, Ser. No. 208,588
Claims priority, application Switzerland, July 24, 1961, 8,715/61
8 Claims. (Cl. 260—2)

The present invention provides flame-retarding, curable mixtures of 1:2-epoxy compounds and curing agents for epoxy resins; said mixtures contain, calculated from the total weight of 1:2-epoxy compound(s), at least 25% by weight, and preferably at least 30% by weight, of reaction products of dialkylphosphites or dialkenylphosphites with 1:2-epoxy compounds (the 1:2-epoxy compounds preferably being such as have an epoxide equivalence greater than 1), or of the reactants giving rise to such reaction products.

The phosphoriferous epoxy compounds may be cured by themselves, or—calculated from the total weight of epoxy resin—together with at most 75% by weight of other known polyepoxy compounds, by means of the conventional curing agents for epoxy resins, such as amines or acid anhydrides, to yield flame-retarding or self-extinguishing products which surprisingly have in general as good mechanical properties and heat distortion characteristics according to Martens (DIN) as the corresponding underlying phosphorus-free cured epoxy resins which do not possess any flame-retarding properties.

The 1:2-epoxy compounds having an epoxide equivalence greater than 1, which are preferred starting materials for the present process, are compounds that contain $n$ groups of the formula

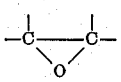

(where $n$ is a whole or fractional number greater than 1) calculated from the average molecular weight. The 1:2-epoxide groups may be terminal or inner ones. Terminal 1:2-epoxide groups are more especially 1:2-epoxyethyl or 1:2-epoxypropyl groups. Preferably, they are 1:2-epoxypropyl groups linked to an oxygen atom, that is to say glycidyl ether or glycidyl ester groups. Compounds comprising inner epoxide groups contain at least one 1:2-epoxide group in an aliphatic chain

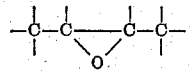

or attached to a cycloaliphatic ring.

As polyglycidyl ethers there are suitable the known compounds obtained by alkaline condensation of epichlorohydrin with polyols. Polyols especially suitable for use in the present invention are polyphenols such as phenol-novolaks or cresol-novolaks, resorcinol, pyrocatechol, hydroquinone, 1.4-dihydroxynaphthalene, bis-[4-hydroxyphenyl]-methylphenylmethane, bis-[4 - hydroxyphenyl]-tolylmethane, 4:4'-dihydroxydiphenyl, bis-[4-hydroxy-phenyl]-sulfone and more especially 4:4'-dihydroxydiphenyl-dimethylmethane (bisphenol A).

Polyglycidyl ethers suitable for use in the present invention correspond to the average formula

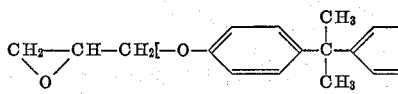 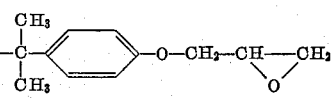

in which Z is a whole number from 0 to 6. When Z=0, there is obtained the diglycidyl ether of bisphenol A containing about 4.8 to 5.6 epoxide equivalents per kg., which is liquid at room temperature. It is likewise possible to use polyglycidyl ethers of higher molecular weight containing about 0.5 to 3.5 epoxide equivalents per kg., for example those in which Z=2, 3, 4, 5 or 6. As a rule, these compounds are solid at room temperature.

Furthermore, there are suitable polyglycidyl esters obtained by reacting a dicarboxylic acid with epichlorohydrin or dichlorohydrin in the presence of an alkali. Such polyesters may be derived from aliphatic dicarboxylic acids such as oxalic, succinic, glutaric, adipic, pimelic, suberic, azelaic, sebacic acid, and more especially from aromatic dicarboxylic acids such as phthalic, isophthalic, terephthalic acid, 2:6-naphthalenedicarboxylic acid, diphenyl-ortho:ortho:dicarboxylic acid, ethyleneglycol-bis-(para-carboxyphenyl)-ethers and the like. There may be mentioned, for example, diglycidyl adipate and diglycidyl phthalate, as well as diglycidyl esters corresponding to the average formula

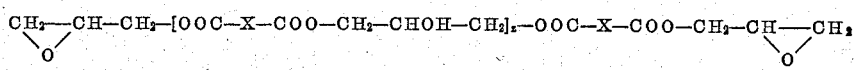

in which X represents an aromatic hydrocarbon radical, such as a phenylene radical, and Z is a whole or fractional small number.

As epoxy compounds containing an inner 1:2-epoxide group there are suitable epoxidised diolefines, dienes or cyclic dienes, such as 1:2:5:6-diepoxyhexane, 1:2:4:5-diepoxyclyclohexane, dicyclopentadiene diepoxide, dipentene diepoxide and more especially vinylcyclohexene diepoxide; epoxidised diolefinically unsaturated carboxylic acid esters such as methyl - 9:10:12:13-diepoxystearate; the dimethyl ester of 6:7:10:11-diepoxyhexadecane-1:16-dicarboxylic acid. There may further be mentioned epoxidised mono-, di- or polyethers, mono-, di- or polyesters, mono-, di- or polyacetals containing at least one cycloaliphatic 5-membered or 6-membered ring to which at least one 1:2-epoxide group is linked. As such compounds there are suitable those of the following Formulae I to XII:

(I) 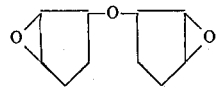

(II) 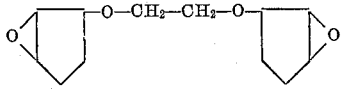

(III) 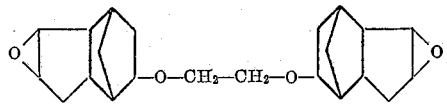

(IV) 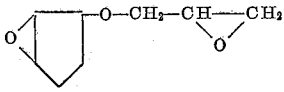

(V) 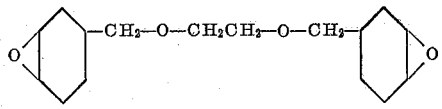

(VI) 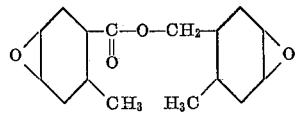

(VII) 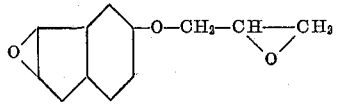

(VIII) 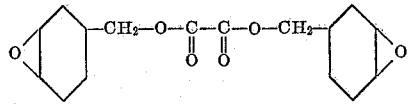

(IX) 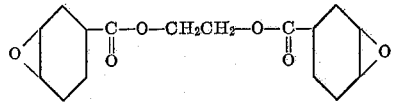

(X) 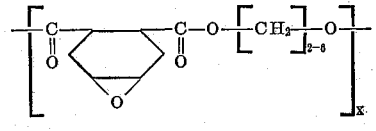

(XI) 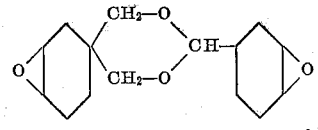

(XII) 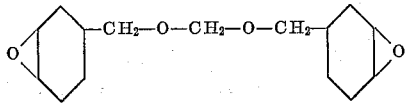

As further compounds containing an inner 1:2-epoxide group there are suitable epoxidised diolefine polymers, more especially polymers of butadiene or cyclopentadiene, and epoxidised fatty acids, fatty oils and fatty esters. As polymers of butadiene there may be mentioned more especially the epoxidised copolymers or adducts with styrene, acrylonitrile, toluene or xylene.

Resins which after curing display particularly good flame-retarding properties are obtained by starting from such 1:2-epoxy compounds that further contain halogen more especially chlorine or bromine; as examples of such halogenated epoxy compounds there may be mentioned:

Diglycidyl ethers of chlorinated bisphenols,
2:3-dichloro-1:4-butanediol-diglycidyl ether,
2:3-dibromo-1:4-butanediol-diglycidyl ether,
2:2:3:3-tetrachloro-1:4-butanediol-diglycidyl ether;

furthermore compounds of the following Formulae XIII–XVI:

(XIII) 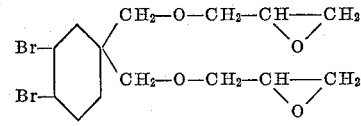

(XIV) 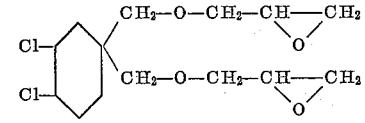

(XV) 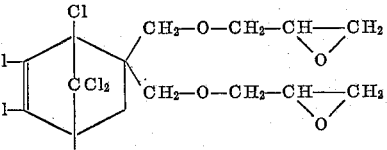

(XVI) 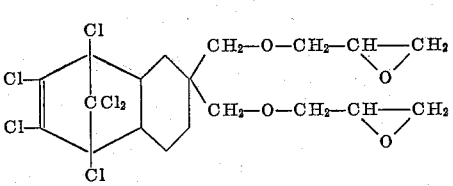

Among monoepoxy compounds, which according to the invention are likewise reacted with dialkylphosphites or dialkenylphosphites, those are especially suitable which contain apart from the epoxy group other reactive groups, such as olefinic carbon-to-carbon double bonds or hydroxyl groups, for example compounds of the following Formulae XVII–XIX:

(XVII) 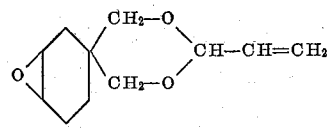

(XVIII) 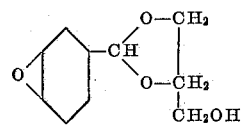

(XIX) 

As dialkylphosphites to be reacted with the 1:2-epoxy compounds there may be mentioned: Dimethylphosphite, diethylphosphite, dipropylphosphite and dibutylphosphite.

As dialkenylphosphites to be reacted with the 1:2-epoxy compounds there may be mentioned: Diallylphosphite and dibutenylphosphite.

The reaction of the epoxy compound with the phosphite is performed by simply heating the reactants together at an elevated temperature, for example at 100 to 200° C. It is possible to discontinue the reaction at any desired moment when the amount of dialkylphosphite or dialkenylphosphite needed to produce flame-retarding properties has been added on, whereupon the excess unreacted phosphite is distilled off. The reaction with halogenated epoxy compounds proceeds faster than with those which are free from halogen. By adding a small amount of sodium metal or of the sodium salt of the phosphite the reaction can be substantially accelerated.

As mentioned above, the phosphoriferous epoxy compounds react with the conventional curing agents for epoxy resins and can, therefore, be cured, with or without application of heat, with addition of such curing agents in the same manner as other polyfunctional epoxy compounds, accompanied by cross-linking.

The term "curing" as used in this context signifies the conversion of the glycidyl ethers into insoluble and infusible resins.

Both basic and acidic curing agents are suitable. Particularly good results have been achieved with: Amines and amides, such as aliphatic and aromatic primary, secondary and tertiary amines, for example mono-, di- and tri-butylamines, para-phenylenediamine, 4:4'-diaminodiphenylmethane, ethylenediamine, N - hydroxyethyl-ethylenediamine, N:N-diethyl-ethylenediamine, diethylenetriamine, meta-xylylenediamine, triethylenetetramine, trimethylamine, diethylamine, triethanolamine, Mannich's bases, piperidine, piperazine, guanidine and guanidine derivatives such as phenyldiguanidine, diphenylguanidine, dicyandiamide, urea-formaldehyde resins, melamine-formaldehyde resins, aniline-formaldehyde resins, polymers of aminostyrenes, polyamides, for example those prepared from dimerised or trimerised unsaturated fatty acids and alkylenepolyamines; isocyanates, isothiocyanates, phosphoric acid, polybasic carboxylic acids and their anhydrides, for example phthalic, methylendomethylene tetrahydrophthalic, dodecenylsuccinic, hexahydrophthalic, hexachloroandomethylene tetrahydrophthalic anhydride or endomethylene tetrahydrophthalic anhydride or mixtures thereof; maleic or succinic anhydride; polyhydric phenols, for example resorcinol, hydroquinone, quinone, phenolaldehyde resins, oil-modified phenolaldehyde resins; reaction products of alcoholates or phenolates with compounds of tautomeric reaction of the type of acetoacetic acid ester; Friedel-Crafts catalysts, for example aluminum chloride, antimony pentachloride, tin tetrachloride, ferric chloride, zinc chloride, boron trifluoride and their complexes with organic compounds, metal fluoborates (for example nickel fluoborates), or boroxines such as trimethoxyboroxine.

The phosphoriferous epoxy compounds may alternatively be manufactured in situ during the curing operation. For this purpose the 1:2-epoxy compound is mixed with the dialkylphosphite or dialkenylphosphite and with the curing agent and the mixture is heated, whereupon a cured product having flame-retarding properties is directly obtained.

As other known epoxy resins, of which the curable mixtures of the invention may contain up to 75% by weight calculated from the total weight of resin, there may be mentioned as examples:

Polyglycidyl ethers of polyhydric alcohols such as butane-1:4-diol or of polyhydric phenols such as resorcinol, bis-[4-hydroxyphenyl]-dimethylmethane or condensation products of aldehydes with phenols (novolaks), polyglycidyl esters of polycarboxylic acids such, for example, as phthalic acid, aminopolyepoxides, such as result from the dehydrohalogenation of reaction products of an epihalohydrin with primary or secondary amines, such as 4:4'-di-(monomethylamino)-diphenylmethane, as well as alicyclic compounds that contain several epoxide groups], such as vinylcyclohexene dioxide, dicylopentadiene dioxide, the glycidyl ether of epoxytetrahydro-dicyclopentadienol-8, or epoxidised Δ³-tetrahydrobenzal-Δ³'-cyclohexene-1':1'-dimethanol.

The curable mixtures of the invention may further contain suitable plasticisers such as dibutyl phthalate, dioctyl phthalate or tricresyl phosphate, inert diluents or so-called active diluents, more especially monoepoxides, for example butylglycide or cresylglycide.

Furthermore, the curable mixtures of the invention may be admixed at any phase prior to curing with other conventional additives, such as fillers, dyestuffs, pigments, flame-retarding substances, mould lubricants or the like. Suitable extenders and fillers are, for example, asphalt, bitumen, glass fibers, mica, quartz meal, cellulose, kaolin, ground dolomite, colloidal silica having a large specific surface (Aerosil) or metal powders, such as aluminium powder.

The curable mixtures of the invention may be used, with or without fillers, if desired in the form of solutions or emulsions, as textile assistants, laminating resins, paints, lacquers, dipping resins, casting resins, moulding compositions, sealing compounds, putties, flooring compositions, potting and insulating compounds for the electrical industry, adhesives and the like, as well as in the manufacture of such products.

Unless otherwise indicated, parts and percentages in the following examples are by weight, and the relationship between part by weight and part by weight and part by volume is the same as that between the kilogram and the liter.

*Example 1*

A mixture of 40 parts of dimethylphosphite and 200 parts of the chlorinated epoxy resin described below, containing 3.6 epoxide equivalents per kg. (resin A) is stirred and heated for 11 hours at 140° C., and the reaction mixture is then distilled under a vacuum of 0.1 mm. Hg at a bath temperature of 100–110° C. A total of 19.9 parts of dimethylphosphite and other volatile substances is recovered. The viscid, dark-brown residue contains 2.3 epoxide equivalents per kg. and 2.34% of phosphorus (resin B).

The epoxy resin (resin A) used as starting material in the above reaction is prepared thus:

An equimolecular mixture of 69 parts of hexachloropentadiene and 50 parts of 2-butenediol-1:4-digylcidyl ether is heated for 14 hours at 120° C. in a reactor provided with a reflux condenser, a thermometer and an agitator. The batch is then allowed to cool and subjected to fractional distillation under reduced pressure (0.1 mm. Hg). After having distilled off 40 parts of unreacted hexachlorocyclopentadiene and 26 parts of unreacted 2-butenediol-1:4-diglycidyl ether, there are obtained as residue 53 parts of a viscous liquid which contains 3.6 epoxide equivalents per kg. and consists predominantly of the adduct of the formula

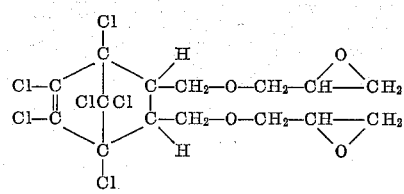

*Example 2*

A mixture of 27 parts of dimethylphosphite and 150 parts of the chlorinated epoxy resin containing 3.3 epoxide equivalents per kg., described below, is stirred and heated for 8 hours at 140° C. The volatile constituents of the mixture are then distilled off under a pressure of 0.5 mm. Hg and at a bath temperature of 100 to 110°C. The viscid, dark-brown residue contains 1.87% of phosphorus and 2.7 epoxide equivalents per kg.

The epoxy resin used as starting material in the above reaction is prepared thus:

A mixture of 97 parts of the diglycidyl ether of 1:1-bis-[hydroxymethyl]-cyclohexene-3 and 156 parts (corresponding to 50% molar excess) of hexachlorocyclopentadiene is heated for 15 hours at 140° C.

88 parts of excess hexachlorocyclopentiene are then distilled off under a vacuum of 0.1 mm. Hg and there are obtained as residue 161 parts of a light-brown liquid which contains 3.3 epoxide equivalents per kg. and consists predominantly of the adduct of the formula

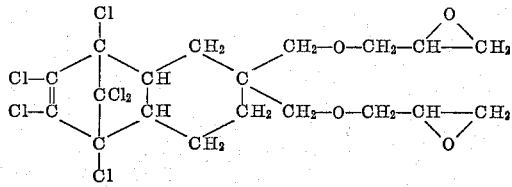

Example 3

(a) 146 parts of diethylphosphite are heated for 24 hours at 140° C. with 400 parts of an epoxy resin which is liquid at room temperature, contains about 5.3 epoxide equivalents per kg., and has been prepared by reacting epichlorohydrin with bis-[4-hydroxyphenyl] - dimethylmethane in the presence of alkali (resin C). The volatile constituents of the batch are then distilled off under 0.1 mm. Hg pressure at a bath temperature of 100° C. The viscous, light-yellow residue (resin D) contains 2.75% of phosphorus and 4.2 epoxide equivalents per kg.

(b) When the reaction described above under (a) is carried out for 24 hours at 155° C. and is followed by usual working up, there is obtained a viscid, light-yellow residue (resin E) which contains 3.1 epoxide equivalents per kg. and 4.37% of phosphorus.

(c) When the reaction described under (a) above is carried out in the presence of 0.49 part of sodium metal for 4 hours at 140° C., followed by usual working up, there results a light-coloured viscous resin which contains 3.88 epoxide equivalents per kg. and 3.04% of phosphorus.

Example 4

A mixture of 113 parts of dimethylphosphite and 400 parts of 1:4-butanediol diglycidyl ether (resin F) containing 7.7 epoxide equivalents per kg. is heated for 12 hours at 160° C. The volatile constituents are then expelled at a bath temperature of 100° C. under a pressure of 0.1 mm. Hg. The thinly liquid, light-coloured residue (resin G) contains 3.69% of phosphorus and 6.17 epoxide equivalents per kg.

Example 5

A mixture of 24 parts of dimethylphosphite and 100 parts of the epoxide, described below, containing 4.4 epoxide equivalents per kg., is heated for 8 hours at 120° C. The volatile constituents are then distilled off at a bath temperature of 110° C. under a pressure of 0.6 mm. Hg. The slightly viscous, light-coloured residue contains 3.65% of phosphorus and 3.5 epoxide equivalents per kg.

The epoxy resin used as starting material in the above reaction is prepared thus:

736 parts (=4 molecular proportions) of the acetal from Δ³-tetrahydrobenzaldehyde and glycerol are dissolved in 2400 parts by volume of benzene with stirring at room temperature, and 530 parts of anhydrous sodium carbonate are then suspended in this solution.

While cooling this suspension with water, it is mixed dropwise with vigorous stirring in the course of about 5 hours with 800 parts of peracetic acid of about 42% strength (containing about 46% of free acetic acid, about 3% of hydrogen peroxide, about 10% of water and about 1% of sulfuric acid) at a rate such that an internal temperature of 19–25° C. is maintained. The suspended salt is then filtered off. The salt residue is washed with 5×800 parts by volume of benzene. The combined benzene filtrates are stirred at room temperature for about 12 hours with 424 parts of anhydrous, ground and sifted sodium carbonate. The salt is filtered off and washed with 5×250 parts by volume of benzene. The benzene is then expelled from the combined filtrates under reduced pressure at an internal temperature not exceeding 40° C. Further portions of solvent can be removed by heating for 1½ hours at a bath temperature of about 40° C. under a pressure of 0.1 to 0.2 mm. Hg. Yield: 794 parts of an almost colorless, liquid product which contains 4.4 epoxide equivalents per kg. and consists predominantly of the epoxide of the formula

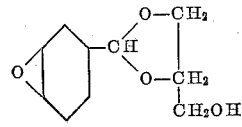

Example 6

A mixture of 25 parts of dimethylphosphite and 100 parts of the epoxy resin described below (resin H) which contains 4.63 epoxide equivalents per kg., is stirred for 12 hours at 170° C. The volatile constituents are then expelled at a bath temperature of 110° C. under 0.2 mm. Hg pressure. The light-colored, thinly liquid residue (resin J) contains 2.61% of phosphorus and 3.8 epoxide equivalents per kg.

The epoxy resin used as starting material in the above reaction (resin H) is prepared thus:

900 parts of the acetal from 1:1-bis-[hydroxymethyl]-cyclohexene-3 and acrolein are dissolved in 2250 parts of benzene, 100 parts of sodium acetate are added, and 1045 parts of peracetic acid of 40% strength are cautiously stirred in dropwise at 25–30° C. After about 4 hours 100% of the calculated peracetic acid has undergone reaction. The batch is then agitated in a separating funnel with 3×200 parts by volume of water and 4×300 parts by volume of saturated sodium carbonate solution (until an alkaline reaction has been established), then dried over sodium sulfate and the benzene is distilled off under reduced pressure.

The epoxidised acetal (3-vinyl-2:4-dioxaspiro(6:6)-9:10-epoxyundecan) of the formula

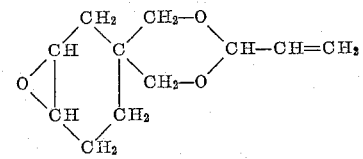

passes over at 90 to 98° C. under 0.5 to 0.6 mm. Hg. pressure. Yield: 739 parts=75.5% of the theoretical. Epoxide content: 4.63 epoxide groups per kg. (theoretical content: 5.1 epoxide groups per kg.).

Example 7

A mixture of 110 parts of dimethylphosphite and 414 parts of the 3:4-dibromocyclohexene-1:1-dimethanol diglycidyl ether described below, which contains 3.72 epoxide equivalents per kg. and 41.4% of bromine, is heated for 7 hours at 140° C. The unreacted phosphite is then distilled off, whereupon the mixture is heated to 110° C. under 0.1 mm. Hg pressure. There are left 417 parts of a yellow liquid which contains 2.51% of phosphorus, 37.9% of bromine and 2.75 epoxide equivalents per kg.

The brominated diglycidyl ether used as starting material is prepared thus:

327 parts (=1 molecular proportion) of Δ³-cyclohexene-1:1-dimethanol-bis(α-monochlorohydrin) ether are suspended in 100 parts by volume of carbon tetrachloride, and 160 parts (=1 molecular proportion) of bromine, dissolved in 200 parts of carbon tetrachloride, are added dropwise from a dropping funnel within 1½ hours at a temperature of 10 to 15° C. 240 parts of sodium hydroxide solution of 50% strength (=3 molecular proportions) are then dropped in, and the batch is stirred for 30 minutes at 50° C., cooled, the precipitated sodium chloride is dissolved by adding 300 parts by volume of water, and the organic phase is separated. After having distilled off the solvent, there are obtained 401 parts of a medium viscous, almost colorless liquid which contains 3.72 epoxide equivalents per kg. and 41.4% of bromine. The product consists predominantly of the dibrominated diglycidyl ether of the formula

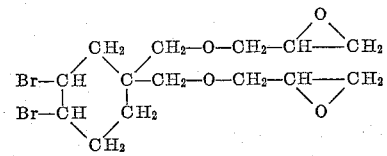

Example 8

A mixture of 568 parts of the diepoxide of the formula

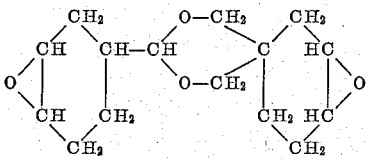

which has been prepared by epoxidising Δ³-tetrahydrobenzal-Δ³'-cyclohexene-1:1'-dimethanol with peracetic acid and which contains 6.4 epoxide equivalents per kg., and 200 parts of dimethylphosphite which has been heated for 5 hours at 190° C., is boiled for 24 hours at 137–142° C.

The volatile constituents are expelled by heating the batch at a bath temperature of 120–140° C. under 2 mm. Hg pressure. The residue has a softening point of 55° C. (measured on the Kofler heater) and contains 5.6% of phosphorus and 3.6 epoxide equivalents per kg.

Example 9

A mixture of 50 parts of 3:4-epoxy-6-methylcyclohexane-carboxylic acid - 3:4 - epoxy-6-methylcyclohexylmethyl ester (containing 6.5 epoxide equivalents per kg.), 16.7 parts of dimethylphosphite and 0.03 part of sodium metal is stirred for 14 hours at 135–137° C. The volatile constituents are then distilled off at a bath temperature of 115° C. under 0.1 mm. Hg pressure. The light-coloured residue has a viscosity of 3300 centipoises at 25° C. and contains 4.8% of phosphorus and 4.55 epoxide equivalents per kg.

Example 10

212 parts of dimethylphosphite and 300 parts of vinylcyclohexene dioxide containing 12.8 epoxide equivalents per kg. are boiled and stirred for 6 hours at 140° C. The volatile constituents are then expelled from the reaction product at a bath temperature of 90–92° C. under 13 mm. Hg pressure. The residue has a viscosity of 20 centipoises at 25° C. and contains 4.5% of phosphorus and 10.2 epoxide equivalents per kg.

When the residue is further distilled at 150° C. bath temperature under a pressure of 16 mm. Hg, excess vinylcyclohexene dioxide passes over between 108° and 112° C. The very highly viscous residue contains then 11.35% of phosphorus and 2.35 epoxide equivalents per kg.

Example 11

A mixture of 50 parts of the diepoxide of the formula

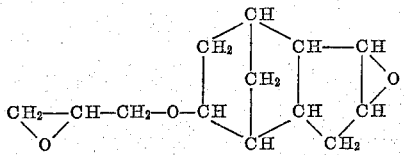

(containing 7.3 epoxide equivalents per kg.), 20 parts of dimethylphosphite and 0.04 part of sodium metal is stirred for 14 hours at 140° C. The volatile constituents are then expelled at a bath temperature of 130° C. under 2 mm. Hg pressure. The residue has a viscosity of 20,000 centipoises at 25° C. and contains 5.88% of phosphorus and 4.55 epoxide equivalents per kg.

Example 12

In the course of 30 minutes, at 104–107° C., 14.5 parts of dialkylphosphite containing 0.01 part of hydroquinone monomethyl ether are stirred dropwise into 100 parts of an epoxy resin which is liquid at room temperature, contains 5.4 epoxide equivalents per kg. and has been prepared by reacting epichlorohydrin with bis-(4-hydroxyphenyl)-dimethylmethane in the presence of alkali. After the addition the mixture is heated for 5 hours at 140° C., and the volatile constituents are then expelled at a bath temperature of 160° C. under 1 mm. Hg pressure. The residue has a softening point of 55° C. (measured on the Kofler heater) and contains 2.86% of phosphorus and 2.0 epoxide equivalents per kg.

Example 13

Mixtures of a specimen of the epoxy resin used as starting material in Example 3 (resin C) and a specimen of the phosphoriferous epoxy resin prepared as described in Example 1 (resin B) and, respectively, of a specimen of the epoxy resin used as starting material in Example 1 (resin A), are fused with phthalic anhydride as curing agent at 120° C., with the use of 0.85 equivalent of anhydride groups per equivalent of epoxide groups of the resins. The mixtures of the resins and curing agent are cast in aluminium moulds (40 x 10 x 140 mm.) and cured for 24 hours at 140° C. The resulting castings display the following properties:

| Resin A, parts | Resin B, parts | Resin C, parts | Heat distortion point according to Martens (DIN), ° C. | Flammability (VDE) | |
|---|---|---|---|---|---|
| | | | | Stage | Burns for— |
| ------ | 30 | 70 | 108 | 1 | 5 seconds. |
| 30 | ------ | 70 | 112 | 0 | 26 seconds. |

Example 14

Specimens of the phosphoriferous epoxy resin prepared as described in Example 3(a) [resin D] and of the phosphoriferous epoxy resin prepared as described in Example 4 [resin G] are stirred with dimethylaminopropylamine as curing agent, using ⅙ molecular proportion of curing agent for every epoxide equivalent. The mixtures are cast in moulds and cured for 24 hours at 40° C. The resulting hard castings display the following properties:

| Resin D, parts | Resin B, parts | Resin C, parts | Heat distortion point according to Martens (DIN), ° C. | Flammability (VDE) | |
|---|---|---|---|---|---|
| | | | | Stage | Burns for— |
| ------ | 30 | 70 | 108 | 1 | 5 seconds. |
| 30 | ------ | 70 | 112 | 0 | 26 seconds. |

Example 14

Specimens of the phosphoriferous epoxy resin prepared as described in Example 3(a) [resin D] and of the phosphoriferous epoxy resin prepared in Example 4 [resin G] are stirred with dimethylaminopropylamine as curing agent, using ⅙ molecular proportion of curing agent for every epoxide equivalent. The mixtures are cast in moulds and cured for 24 hours at 40° C. The resulting hard castings display the following properties:

| Resin D, parts | Resin G, parts | Resin C, parts | Resin F, parts | Flammability (VDE) | |
|---|---|---|---|---|---|
| | | | | Stage | Burns for— |
| 70 | 30 | ------ | ------ | 1 | 2 seconds. |
| ------ | ------ | 70 | 30 | 0 | 60 seconds. |

Example 15

A mixture of 100 parts of the phosphoriferous epoxy resin prepared as described in Example 3(b) [resin E] and 39 parts of phthalic anhydride is fused at 120° C. A casting prepared from this mixture and cured for 24 hours at 140° C. displays the following properties:

Flexural strength, kg./mm.² _____ 14.6
Impact strength, cm. kg./cm.² _____ 9.5
Flammability (VDE) _____ Stage 1
Burns for 7 seconds.

Example 16

Mixtures of the resins A and C used as starting material in Examples 1 and 3 respectively with specimens of the resin H used as starting material in Example 6 and of resin J (phosphoriferous epoxide) are mixed with phthalic anhydride as curing agent and fused at 120° C., using 0.85 equivalent of anhydride groups for every equivalent of epoxide groups of the resins. After having been cured for 24 hours at 140° C., the resulting castings display the following properties:

| Resin J, parts | Resin A, parts | Resin C, parts | Resin H, parts | Heat distortion point according to Martens (DIN), ° C. | Flammability (VDE) | |
|---|---|---|---|---|---|---|
| | | | | | Stage | Burns for— |
| 30 | 25 | 45 | ------ | 102 | 1 | 4 seconds. |
| ------ | 25 | 45 | 30 | 106 | 0 | >60 seconds. |

Example 17

(a) A mixture of 10 parts of dimethylphosphite and 60 parts of phthalic anhydride with 90 parts of an epoxy resin which is liquid at room temperature, contains about 5.3 epoxide equivalents per kg. and has been prepared by reacting epichlorohydrin with bis-[4-hydroxyphenyl]-di-methylmethane in the presence of alkali, is fused at 120° C., cast in moulds, and cured for 5 hours at 120° C. and then for 24 hours at 140° C. The resulting light-colored, self-extinguishing casting displays the following properties:

Flexural strength, kg./mm.$^2$ _____ 15.9
Impact strength, cm. kg./cm.$^2$ _____ 7.2
Heat distortion point according to Martens (DIN),
 ° C. _____ 83
Flammability (VDE) _____ Stage 1
Burns for 5 seconds.
Cold water absorption (4 days at 20° C.), percent _____ 0.23

(b) 90 parts of the epoxy resin used in Example 17(a) and 10 parts of dimethylphosphite are stirred with triethylenetetramine as curing agent, using ⅙ molecular proportion of triethylenetetramine for every epoxide equivalent. The casting is cured for 24 hours at 40° C. and displays then the following properties:

Flexural strength, kg./mm.$^2$ _____ 14.7
Impact strength, cm. kg./cm.$^2$ _____ 6.1
Heat distortion point according to Martens (DIN),
 ° C. _____ 58
Flammability (VDE) _____ Stage 1
Burns for 0 seconds.

Example 18

A solution of 30 parts of the phosphoriferous epoxy resin prepared as described in Example 7 in 100 ml. of trichlorethylene is mixed with 2.5 parts by volume of triethylenetetramine and used for impregnating textile materials of polyamide, polyester and polyacrylonitrile until the fibrous material has absorbed about 20 to 30% of dry substance. The textile materials are then dried at 60 to 80° C. and cured. Alternatively, curing may be performed at room temperature.

A fabric treated as described above is very little flammable. After having removed the source of heat, the flame is extinguished within 1 to 2 seconds. Apart from having been rendered flameproof, the fabric has also become rigid. The flame-retarding finish is fast to washing.

By using as curing agent, instead of triethylenetetramine, a polyamide obtained by condensing unsaturated vegetable fatty acids with diethylenetriamine (Versamide 115 registered trademark or N:N-diethylpropylenediamine, a soft, flameproof finish is achieved.

Example 19

50 parts of the phosphoriferous epoxy resin prepared as described in Example 7 are dissolved in 100 parts by volume of chloroform, carbon tetrachloride or trichlorethylene, and 4 parts by volume of triethylenetetramine are added. This solution is used to impregnate a bleached or dyed cotton fabric so that the fabric retains about 60% of dry substance; it is then dried at about 60 to 80° C. and cured. If desired, the curing may be performed at room temperature.

The treated cotton fabric is sparingly flammable, and the flame-retarding finish is fast to washing.

What is claimed is:

1. A process for the preparation of a hardened epoxy resin product which comprises contacting a composition consisting essentially of (I) a component selected from the group consisting of (1) a mixture of (a) a 1,2-epoxy compound having a 1,2-epoxy equivalency greater than one and (b) a member selected from the class consisting of dialkyl phosphite and dialkenyl phosphite and (2) the reaction product obtained by heating at 100–200° C. (a) a 1,2-epoxy compound having a 1,2-epoxy equivalency greater than one and (b) a member selected from the class consisting of dialkyl phosphite and dialkenyl phosphite and (II) a 1,2-epoxy compound free from phosphorous having a 1,2-epoxy equivalency greater than one; component (I) being present in an amount of at least 25% by weight calculated on the total weight of 1,2-epoxy compound present and component (II) being present in an amount from 0–75% by weight calculated on the total amount of 1,2-epoxy compound present with (III) a curing agent for epoxy 1,2-epoxy compounds having a 1,2-epoxy equivalency greater than one.

2. A process according to claim 1 wherein component (I) is present in an amount of at least 30% by weight.

3. A process according to claim 1 wherein the 1,2-epoxy compound is the diglycidyl ether of a halogenated cycloaliphatic dialcohol.

4. A process according to claim 1 wherein the curing agent is an elevated temperature reactive curing agent.

5. A hard solid resinous mass obtained by contacting a composition consisting essentially of (I) a component selected from the group consisting of (1) a mixture of (a) a 1,2-epoxy compound having a 1,2-epoxy equivalency greater than one and (b) a member selected from the class consisting of dialkyl phosphite and dialkenyl phosphite and (2) the reaction product obtained by heating at 100–200° C. (a) a 1,2-epoxy compound having a 1,2-epoxy equivalency greater than one and (b) a member selected from the class consisting of dialkyl phosphite and dialkenyl phosphite and (II) a 1,2-epoxy compound free from phosphorous having a 1,2-epoxy equivalency greater than one; component (I) being present in an amount of at least 25% by weight calculated on the total weight of 1,2-epoxy compound present and component (II) being present in an amount from 0-75% by weight calculated on the total amount of 1,2-epoxy compound present with (III) a curing agent for epoxy 1,2-epoxy compounds having a 1,2-epoxy equivalency greater than one.

6. A product according to claim 5 wherein component (I) is present in an amount of at least 30% by weight.

7. A product according to claim 5 wherein the 1,2-epoxy compound is the diglycidyl ether of a halogenated cycloaliphatic dialcohol.

8. A process according to claim 5 wherein the curing agent is an elevated temperature reactive curing agent.

References Cited by the Examiner

UNITED STATES PATENTS

| 2,506,486 | 5/1950 | Bender et al. | 260—2 |
| 2,826,592 | 3/1958 | Mueller et al. | 260—2 |
| 3,081,333 | 3/1963 | Renner | 260—2 |

FOREIGN PATENTS

| 869,969 | 6/1961 | Great Britain. |

WILLIAM H. SHORT, *Primary Examiner.*

H. D. ANDERSON, *Assistant Examiner.*